UNITED STATES PATENT OFFICE.

BENJAMIN F. JEWETT, OF MALONE, NEW YORK.

IMPROVEMENT IN THE MANUFACTURE OF POTASH AND PEARLASH.

Specification forming part of Letters Patent No. 57,728, dated September 4, 1866.

*To all whom it may concern:*

Be it known that I, BENJAMIN F. JEWETT, of Malone, in the county of Franklin and State of New York, have invented a new and valuable Mode of Manufacturing Pearlash from Potash and common house-ashes; and I do hereby declare that the following is a full, clear, and exact description of my said invention.

The nature of my invention consists in mixing black muck with the lye of potash or house-ashes, by means whereof the black salts made therefrom are susceptible of being pearled in the oven.

It is generally known that so long as ashes were procured in large quantities by the burning of large heaps of logs, while in process of clearing the land, there was but little difficulty experienced in manufacturing them into pearlashes; but when the clearing of the land had ceased, to a great extent, and the ashes to be manufactured were mostly gathered from houses where the timber had been burned in fire-places and stoves, the black salts made from the ashes last named could not be pearled.

I infer from this state of facts that when ashes are made in the fields from log heaps they become mixed to some extent with muck and earth, which contain decomposed vegetable matter, and that in such decomposed vegetable matter is to be found some chemical substances which aid the process of pearling black salts.

I therefore have devised means by which I may furnish to black salts made of potash or of house-ashes the chemical elements necessary to enable the operator to change them into pearlash.

My process is as follows, namely: I first change my potash into ley by diluting it in water. To each barrel of potash thus changed to ley I add eight bushels, or thereabout, of black muck, and mix them well together. I then boil down this mixture until it becomes black salts, and place it in the pearling-oven, when it is changed into pearlash in the usual manner. The heat of the oven drives off the dirt portion of the muck or consumes it and leaves the pearlash as clean and white as is done by the ordinary means.

The proportions herein mentioned are not arbitrary. They will necessarily vary, according to the amount of decomposed earthy matter found in the muck; but for such muck as is usually found in low meadow lands eight bushels to a barrel of potash is about the proportion required.

In manufacturing pearlash from common house-ashes the muck must be mixed with the ley in about the proportions herein given for manufacturing potash into pearlash. First estimate sufficient ley for a barrel of potash, and then mix therewith about eight bushels of muck.

What I claim as my invention, and desire to secure by Letters Patent, is—

The process of manufacturing potashes and house-ashes into pearlash by the use of black muck, substantially as herein specified.

BENJN. F. JEWETT.

Witnesses:
J. A. SABIN,
H. E. SMITH.